(12) United States Patent
Chen et al.

(10) Patent No.: US 9,467,300 B2
(45) Date of Patent: Oct. 11, 2016

(54) NETWORK DEVICE AND PORT FUNCTION SETTING METHOD THEREOF

(75) Inventors: Kuo-Lun Chen, Tainan (TW); Wei-Ting Wang, Tainan (TW)

(73) Assignee: EDGECORE NETWORKS CORPORATION, Hsinchu (TW)

( * ) Notice: Subject to any disclaimer, the term of this patent is extended or adjusted under 35 U.S.C. 154(b) by 424 days.

(21) Appl. No.: 13/590,600

(22) Filed: Aug. 21, 2012

(65) Prior Publication Data
US 2013/0054984 A1    Feb. 28, 2013

(30) Foreign Application Priority Data
Aug. 22, 2011  (TW) ............................. 100129989 A

(51) Int. Cl.
| | | |
|---|---|---|
| G06F 1/00 | (2006.01) | |
| H04L 12/10 | (2006.01) | |
| G06F 1/32 | (2006.01) | |
| H04L 12/26 | (2006.01) | |

(52) U.S. Cl.
CPC ............. H04L 12/10 (2013.01); G06F 1/3203 (2013.01); H04L 43/0811 (2013.01)

(58) Field of Classification Search
CPC ... G06F 1/3203; H04L 12/10; H04L 43/0811
USPC ................ 713/300, 324, 321, 330; 455/402; 709/223; 370/466
See application file for complete search history.

(56) References Cited

U.S. PATENT DOCUMENTS

| | | | | |
|---|---|---|---|---|
| 7,243,251 B2* | 7/2007 | Atias et al. ................... 713/324 |
| 2005/0243861 A1* | 11/2005 | Elkayam ................. H04L 12/10 370/466 |
| 2006/0047800 A1* | 3/2006 | Caveney et al. .............. 709/223 |
| 2007/0220280 A1* | 9/2007 | Karam .................... H04L 12/10 713/300 |
| 2007/0277049 A1* | 11/2007 | Hansalia ................. H04L 12/10 713/321 |
| 2007/0288784 A1* | 12/2007 | Koper ................... G06F 1/3203 713/324 |
| 2008/0049627 A1* | 2/2008 | Nordin .......................... 370/241 |
| 2008/0102693 A1* | 5/2008 | Caveney et al. ........... 439/540.1 |
| 2008/0214140 A1* | 9/2008 | Caveney et al. .............. 455/402 |
| 2010/0106985 A1* | 4/2010 | Panguluri et al. ............ 713/300 |
| 2011/0255611 A1* | 10/2011 | Caveney et al. .............. 375/257 |
| 2012/0102341 A1* | 4/2012 | Hussain et al. ............... 713/300 |
| 2012/0198246 A1* | 8/2012 | German et al. ............... 713/300 |
| 2013/0159754 A1* | 6/2013 | Wendt ..................... H04L 12/10 713/330 |

FOREIGN PATENT DOCUMENTS

| | | |
|---|---|---|
| CN | 1890893 A | 1/2007 |
| CN | 101047514 A | 10/2007 |
| EP | 1 942 600 A1 | 7/2008 |

* cited by examiner

*Primary Examiner* — Aurel Prifti
(74) *Attorney, Agent, or Firm* — Muncy, Geissler, Olds & Lowe, P.C.

(57) ABSTRACT

A network device and a method for the network device to set operation of a port are provided. The network device is connected to a set of power sourcing equipment (PSE) through a port, and the PSE powers the network device through the port. The network device includes an analysis module and a port control module. The analysis module judges whether the port of the network device is connected to the PSE. The port control module provides a port function switch instruction according to a judgment result of the analysis module, so as to enable or disable the port.

13 Claims, 8 Drawing Sheets

NETWORK DEVICE AND PORT FUNCTION SETTING METHOD THEREOF

CROSS-REFERENCE TO RELATED APPLICATION

This application claims the benefit of Taiwan Patent Application No. 100129989, filed on Aug. 22, 2011, which is hereby incorporated by reference for all purposes as if fully set forth herein.

BACKGROUND OF THE INVENTION

1. Field of Invention

The present invention relates to a network device, and more particularly to a network device for detecting types of network equipment connected to the network device in order to adjust a working state of the network equipment.

2. Related Art

According to IEEE 802.3af/at specifications, a POE system (Power Over Ethernet system) includes a power sourcing equipment (PSE) and a powered device (PD).

Generally speaking, the PSE is usually installed in a network equipment which is responsible for forwarding received data packet, such as a data switch or router. And the PD is disposed in a Consumer Premise Equipment which is used to connect to Internet at client side, for example a modem.

Currently, in an application of the PoE-System, the network equipment normally acts as a PSE for supplying power to an equipment connected thereto. Therefore, the network equipment still consumes its power even it does not serve the equipment connected to the network equipment. Further, the network equipment may be placed at a place where is without power source.

Therefore, how to lower or no power consumption in the network equipment when the network equipment doesn't serve any equipment and how to obtain the power to supply the network equipment are directions towards which efforts are currently being made and the packet bridge equipment.

SUMMARY OF THE INVENTION

The present invention is directed to a network device and a port operation switch method, in which a port operation state can be switched according to the type of a connecting network device, so as to eliminate the defects in the prior art.

In order to solve the above problems, the present invention discloses a network device, which comprises a port used to connect a set of PSE, where the PSE powers the network device through the port. The network device comprises an analysis module and a port control module. The analysis module judges whether the port of the network device is connected to the PSE. The port control module provides a port function switch instruction according to a judgment result of the analysis module, so as to enable or disable the port.

In order to solve the above problems, the present invention discloses a method for a network device to set operation of a port, where the port is capable of powering the network device by being connected to a set of PSE. The method comprises: an analysis module judging whether the port is connected to the PSE; a port control module providing a port function switch instruction according to a judgment result of the analysis module; and according to the port function switch instruction, enabling or disabling the port.

The features of the present invention are as follows. (1) The power cost of an internet service provider can be reduced. (2) Limitation is exerted on clients using PSE, so as to ensure that network equipment at an internet service provider can acquire sufficient power for maintaining normal operation of the equipment when processing a large amount of network data.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are described below in detail with reference to the accompanying drawings.

Figure 1:
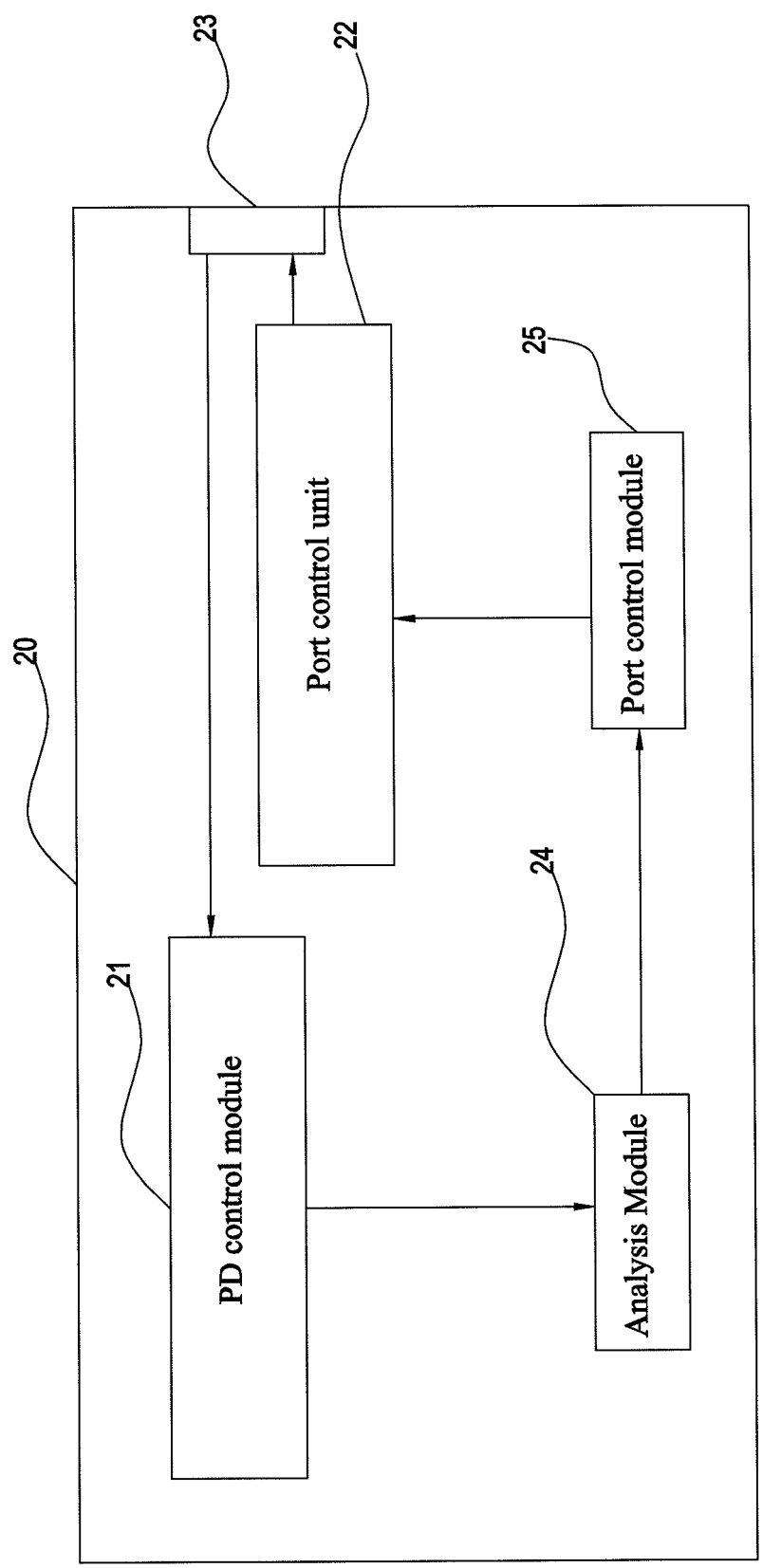
FIG. 1 is a schematic architectural view of a network device according to an embodiment of the present invention.

Referring to FIG. 1, which is a schematic architectural view of a network device according to an embodiment of the present invention. In the embodiment, the network device 20 is disposed at a site of Internet Service Provider. In the present embodiment, the network device is an Ethernet switch/router capable of receiving, sending, and forwarding a data packet.

The network device 20 includes a powered device (PD) control module 21, a port control unit 22, at least one port 23, an analysis module 24, and a port control module 25. Each port 23 is coupled to the PD control module 21 and the port control unit 22 and is used to connect to a customer premise equipment (CPE) in a network. In the preferred embodiment, the customer premise equipment is, for example, a modem capable of receiving and sending a packet sent from a terminal device like as laptop or computer. The analysis module 24 is coupled to the PD control module 21, and the port control module 25 is coupled to the analysis module 24 and the port control unit 22.

It is noted that the port control unit 22, the PD control module 21, the analysis module 24 and the port control module 25 may respectively be a chip set, a processor (for example a Central Processing Unit (CPU) or a Micro-Processing Unit (MPU)), an Integrated Circuit (IC), a control circuit, or other auxiliary circuits or relevant modules and elements, and further be in combination with operation software and firmware, but is not limited thereto.

Figure 2:
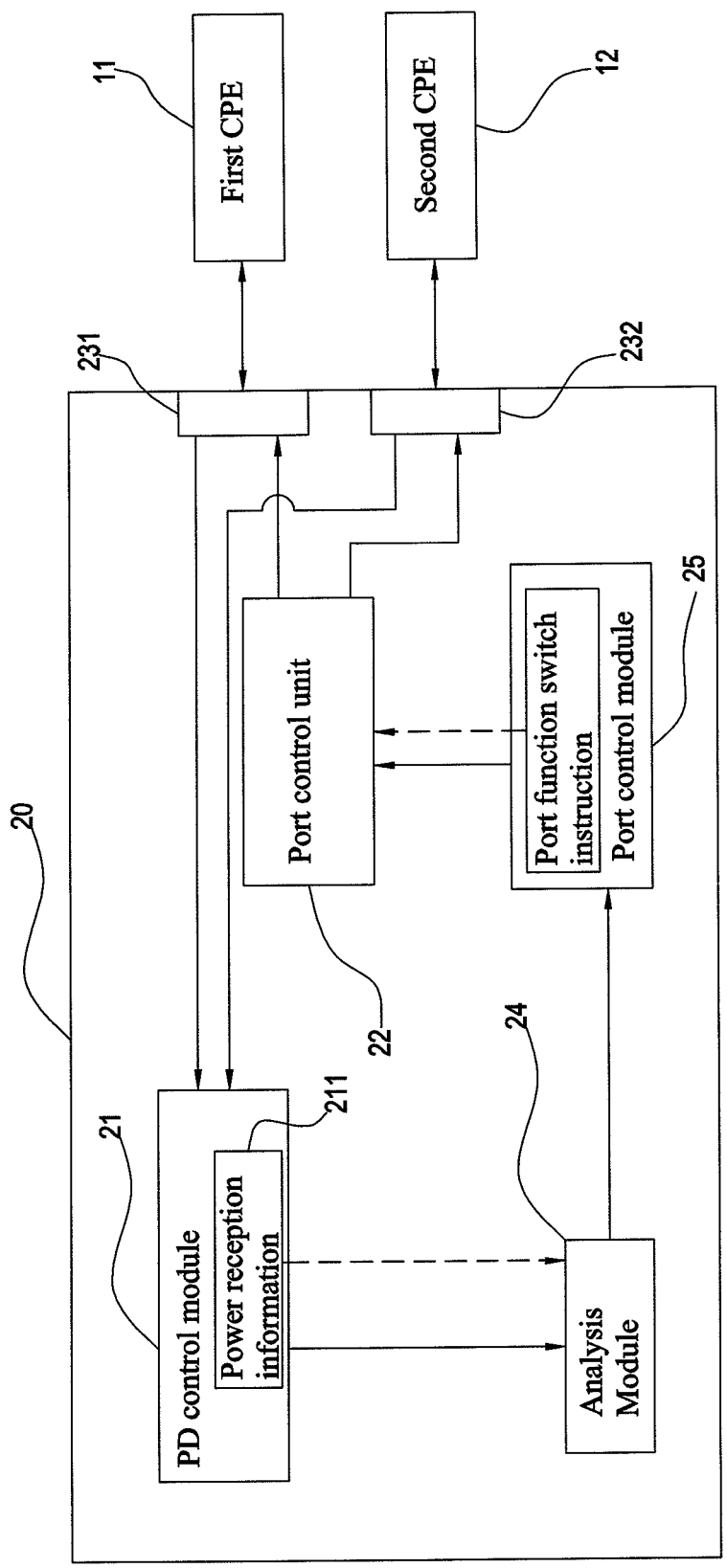
FIG. 2 is a schematic architectural view of a network system according to a first embodiment of the present invention.

FIG. 2 is a schematic architectural view of a network system according to a first embodiment of the present invention. In the embodiment of the present invention, the network device 20 is connected to two CPEs through network lines, but is not limited thereto. As FIG. 2, the first CPE 11 is connected to a first port 231 while the second CPE 12 is connected to a second port 232. It is noted that the first CPE 11 and/or the second CPE 12 equipped with PSE function to supply power via network.

When the PD control module 21 acquires power supplied by the first CPE 11 or the second CPE 12, the PD control module 21 converts the acquired power into working power required by the network device 20, so as to enable the network device 20 to operate.

Through the first port 231 and the second port 232, the PD control module 21 detects whether the first CPE 11 and the second CPE 12 are equipped with power sourcing equipment (PSE) function having the network power supply capability. In the embodiment, the network power supply capability is a capability of performing power supply via networks according to an IEEE 802.3at/af standard. A detection result is provided from the analysis module 24 to the PD control module 21. Alternatively, the PD control module 21 stores the detection result in a storage unit thereof, for example a register or a memory, so that the stored detection result can be read or obtained by the analysis module 24.

The analysis module 24 determines whether the first CPE 11 and the second CPE 12 are devices provided with PSE function according to the detection result generated by the PD control module 21.

The port control module 25 acquires a judgment result from the analysis module 24, or receives the judgment result sent by the analysis module 24. The port control module 25 instructs a port function switch instruction according to the judgment result generated by the analysis module 24, so as to make the port control unit 22 respectively control enabling or disabling each port, such as the first port 231 and the second port 232. It is noted that, the enabling or disabling a port means the port function is partially or wholly enabled or disabled such as power function or data transmission function.

Figure 3A:
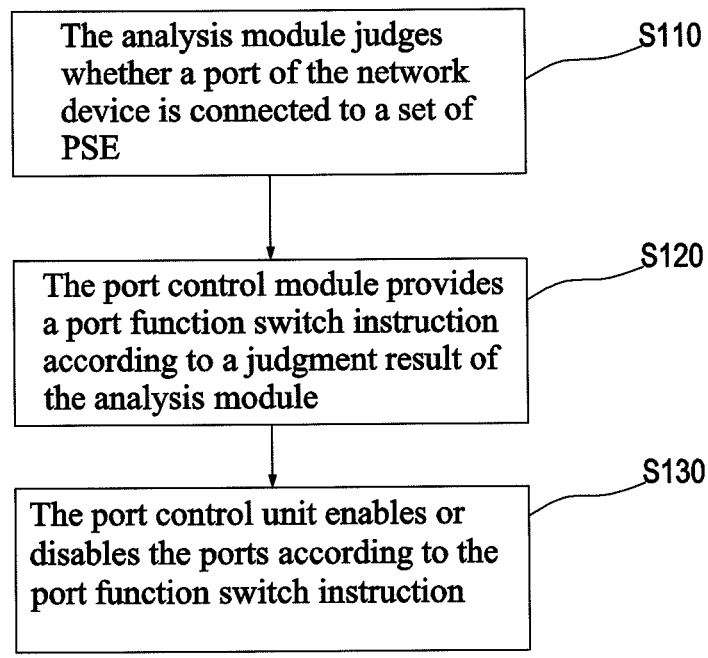
FIG. 3A is a flow chart of a network device setting operation of a port according to an embodiment of the present invention.
Figure 3B:
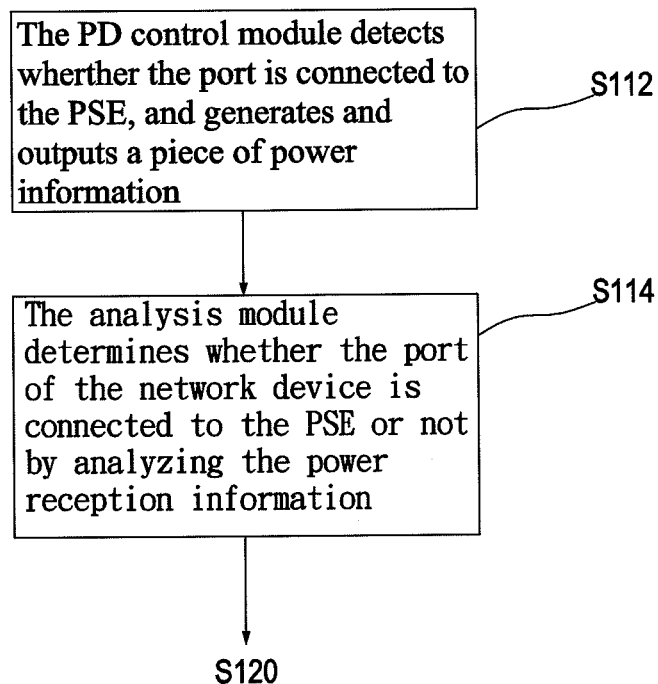
FIG. 3B is a detailed flow chart of the network device setting operation of the port according to the embodiment of the present invention.

Referring to FIG. 3A which is a flow chart of a network device setting a port according to an embodiment of the present invention; and referring to FIG. 3B which is a detailed flow chart of the network device setting the port according to the embodiment of the present invention. The network device 20 is connected to at least one CPE through at least one port, and the embodiment shown in FIG. 2 is taken as an example, but is not limited thereto. Illustration of the method is as follows.

The analysis module 24 judges whether a port of the network device 20 is connected to a device provided with PSE function (Step S110).

The PD control module 21 first judges whether CPE connected to each port is provided with PSE function. Taking FIG. 2 for example, the PD control module 21 analyzes the first CPE 11 connected to the first port 231 and the second CPE 12 connected to the second port 232, so as to determine equipment types of the first CPE 11 and the second CPE 12. In the embodiment, a judgment manner of the PD control module 21 for determining equipment types of the first CPE 11 and the second CPE 12 is a detection manner specified by the IEEE 802.3af/at standard, and whether each port is connected to PSE is analyzed, so as to judge whether each CPE is provided with PSE function, and a piece of power reception information 211 can be generated and outputted according to a judgment result (Step S112). The power reception information 211 may be a value of a group of bytes for indicating that which port receives a power signal.

The analysis module 24 acquires the power reception information 211 from the PD control module 21. It does not matter whether the analysis module 24 actively acquires the power reception information 211 from the PD control module 21 or the analysis module 24 passively acquires the power reception information 211 provided by the PD control module 21, and the present invention is not limited thereto.

The analysis module 24 determines whether the port of the network device 20 is connected to the PSE or not by analyzing data included in the power reception information 211 (Step S114). Taking FIG. 2 for example, the analysis module 24 will determine whether the first CPE 11 and the second CPE 12 are equipped with PSE function or not according to the data included in the power reception information 211.

Then, the port control module 25 provides a port function switch instruction 251 according to a judgment result of the analysis module 24 (Step S120). In this step, the port control module 25 generates and transmits a port function switch instruction 251 to the port control unit 22. In the embodiment, the port function switch instruction 251 includes control information for enabling or disabling functions of the first port 231 or the second port 232.

The port control unit 22 enables or disables the ports according to the port function switch instruction 251 (Step S130). In this embodiment, the port control unit 22 enables the functions of the first port 231, or further disables the functions of the second port 232.

Similarly, assuming that the analysis module 24 judges that the first CPE 11 is not PSE and the second CPE 12 is PSE, the port function switch instruction 251 generated by the port control module 25 will include control information for enabling the functions of the second port 232 and disabling the functions of the first port 231. The port control unit 22 will enable the functions of the first port 231 and disable the functions of the second port 232 according to the port function switch instruction 251.

Similarly, if the analysis module 24 judges that the first CPE and the second CPE 12 are both PSE, the port function switch instruction 251 generated by the port control module 25 includes control information for enabling the first port 231 and the second port 232. The port control unit 22 will enables the functions of the first port 231 and the second port 232 at the same time according to the port function switch instruction 251.

Figure 4:
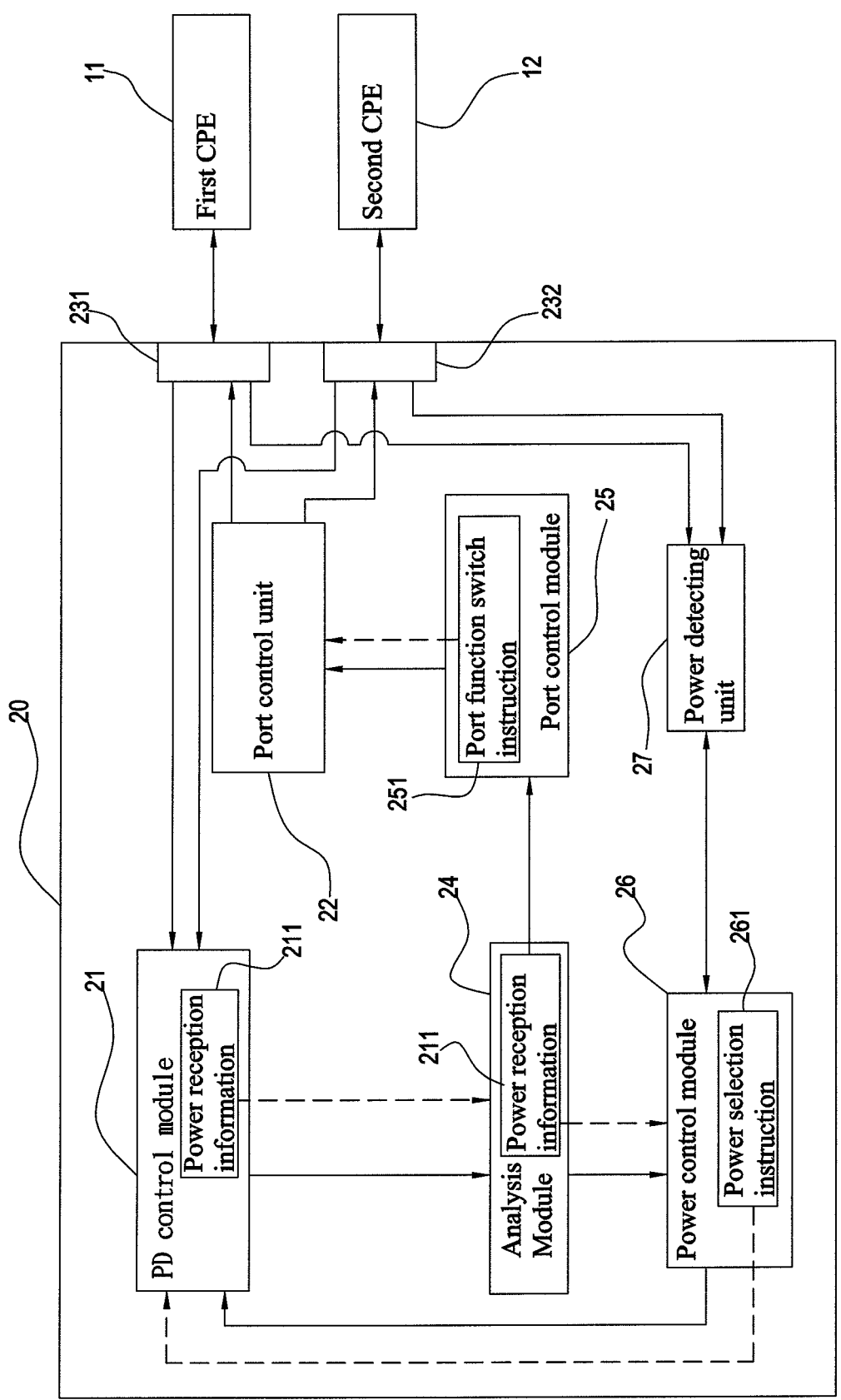
FIG. 4 is a schematic architectural view of a network system according to a second embodiment of the present invention.
Figure 5A:
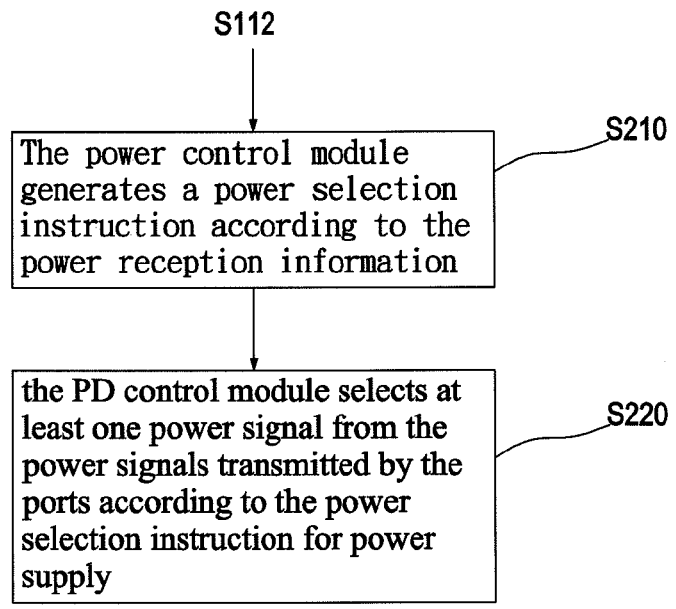
FIG. 5A is a flow chart of power selection according to an embodiment of the present invention.
Figure 5B:
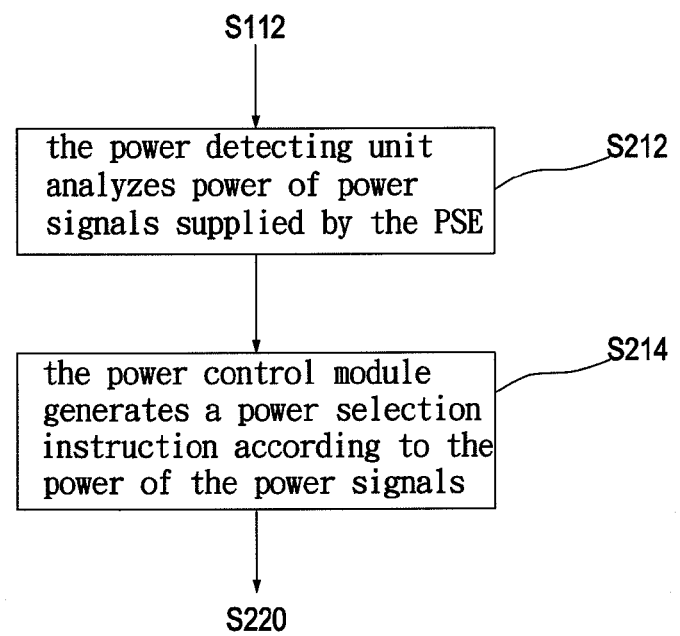
FIG. 5B is a detailed flow chart of the power selection according to the embodiment of the present invention.

Referring to FIG. 4, which is a schematic architectural view of a network system according to a second embodiment of the present invention. Different from that shown in FIG. 2, the network device according to this embodiment further includes a power control module 26 and a power detecting unit 27. The power control module 26 is coupled to the analysis module 24 and the PD control module 21. The power detecting unit 27 is coupled to the power control module 26 and each of the ports (herein the first port 231 and the second port 232 are taken for example). Referring to FIG. 5A, FIG. 5A is a flow chart of power selection according to an embodiment of the present invention; and referring to FIG. 5B, FIG. 5B is a detailed flow chart of the power selection according to the embodiment of the present invention. Illustration of the method is as follows.

After acquiring the power reception information 211 from the PD control module 21, the analysis module 24 transmits the power reception information 211 to the power control module 26. Then, the power control module 26 generates a power selection instruction 261 according to the power reception information 211 (Step S210). The power selection instruction 261 includes the following information types.

(1) The power selection instruction 261 includes a piece of port designation information. In this type, the power control module 26 determines ports having a flowing power signal according to the power reception information 211, designates one of the ports, and outputs the power signal via the designated port for power supply. For example, if power signals flows in both the first port 231 and the second port 232, the port designation information will designate the first port 231 or the second port 232 and the power will be outputted via the first port 231 or the second port 232 according to the designation information.

(2) The power selection instruction 261 includes a piece of port selection information. In this type, the power control module 26 determines ports having a flowing power signal according to the power reception information 211, and sets a selection order of the ports. The PD control module 21 will select one of the ports in accordance with the selection order, and makes the power signal be outputted via the selected port for power supply. The selection order is, for example, an arrangement order of the ports or an order inverse to the arrangement order of the ports, or is determined randomly.

(3) The power control module 26 makes, according to the power reception information 211, the power detecting unit 27 analyzes power of power signals supplied by the PSE (Step S212). Taking FIG. 4 for example, the power detecting unit analyzes the power of the power signals flowing in the first port 231 and the second port 232, and provides a result for the power control module. Then, the power control module 26 generates a power selection instruction 261 according to the power of the power signals (Step S214). In the embodiment, the power selection instruction 261 includes a piece of power designation information, which is used to designate a port being flowed a power signal with the highest power among the ports for supplying power. For example, the power of the power signal corresponding to the first port 231 is the highest, and the power designation information points to the first port 231.

(4) The power selection instruction 261 includes a piece of switch cycle information, which is used to designate a power supply time duration and a switch time period of the power signal transmitted by each of the ports. For example, the switch cycle information instructs each of the power signals to be switched after powering for ten minutes. The PD control module 21 performs power signal switching and selecting between the power signals transmitted by the first port 231 and the second port 232 for each ten minutes.

(5) The power selection instruction 261 includes a piece of power integration information, which is used to designate power signals on which the PD control module performs power integration. For example, if the power signals flow in both the first port 231 and the second port 232, The PD control module will integrate the power signals flowing in both first port 231 and second port 232 by recognizing the power integration information instructing to select the first port 231 and the second port 232, and makes the PD control module integrate the power signals flowing in the first port 231 and the second port 232, so as to form working power meeting power supply demands of the network device 20. Then, the PD control module 21 selects at least one power signal from the power signals transmitted by the ports according to the power selection instruction 261 for power supply (Step S220). The port selected by the PD control module 21 is the port previously designated by the power selection instruction 261, or at least one of the ports is selected according to the port selection order provided by the power selection instruction 261. The power signal transmitted by the selected port or a working signal formed by integrating the power signals is used for powering the network device 20.

Figure 5C:
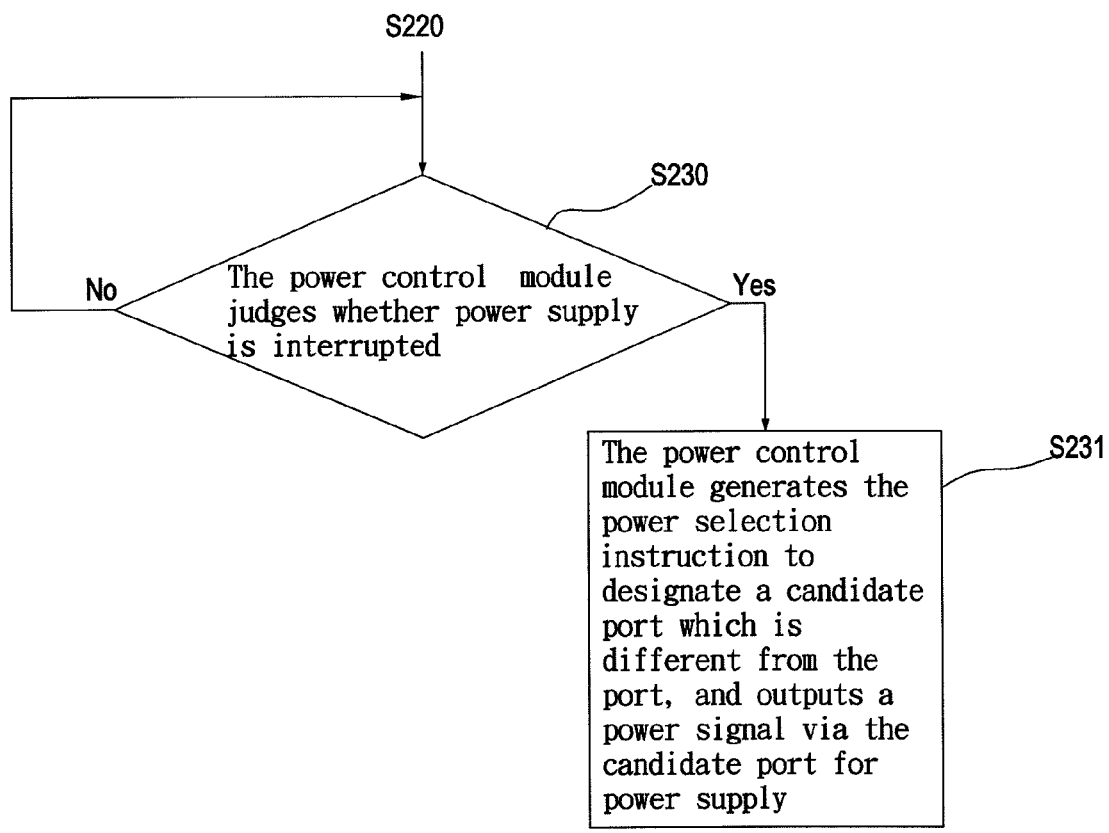
FIG. 5C is a flow chart of power selection after power supply interruption according to an embodiment of the present invention.

Referring to FIG. 4 and FIG. 5C, FIG. 5C is a flow chart of power selection after power supply interruption according to an embodiment of the present invention. Illustration of the method is as follows.

The power control module 26 judges whether power supply is interrupted through the power detecting unit 27 (Step S230). For example, the power control module 26 selects the power signal of the first port 231 as a power source and the power control module 26 makes the power detecting unit 27 keep detecting whether the power signal transmitted by the first port 231 is interrupted or not.

When the power supply being outputted by the port is interrupted, the power control module 26 generates the power selection instruction 261 to designate a candidate port which is different from the port, and outputs a power signal via the candidate port for power supply (Step S231).

Taking FIG. 4 for example, once the first CPE 11 stops power supply, the power detecting unit 27 informs the power control module 26 of the interrupted power supply. In this situation, the power control module 26 firstly removes the port information of first port 231 from the power reception information 211, and selects other ports to be a candidate port. For example, the second port 232 is selected to be the candidate port by the power control module 26, the power selection instruction 261 included port information of the second port 232 will be generated. When receiving the power selection instruction 261, the PD control module 21 will enable the port 232 for power supply.

Figure 6:
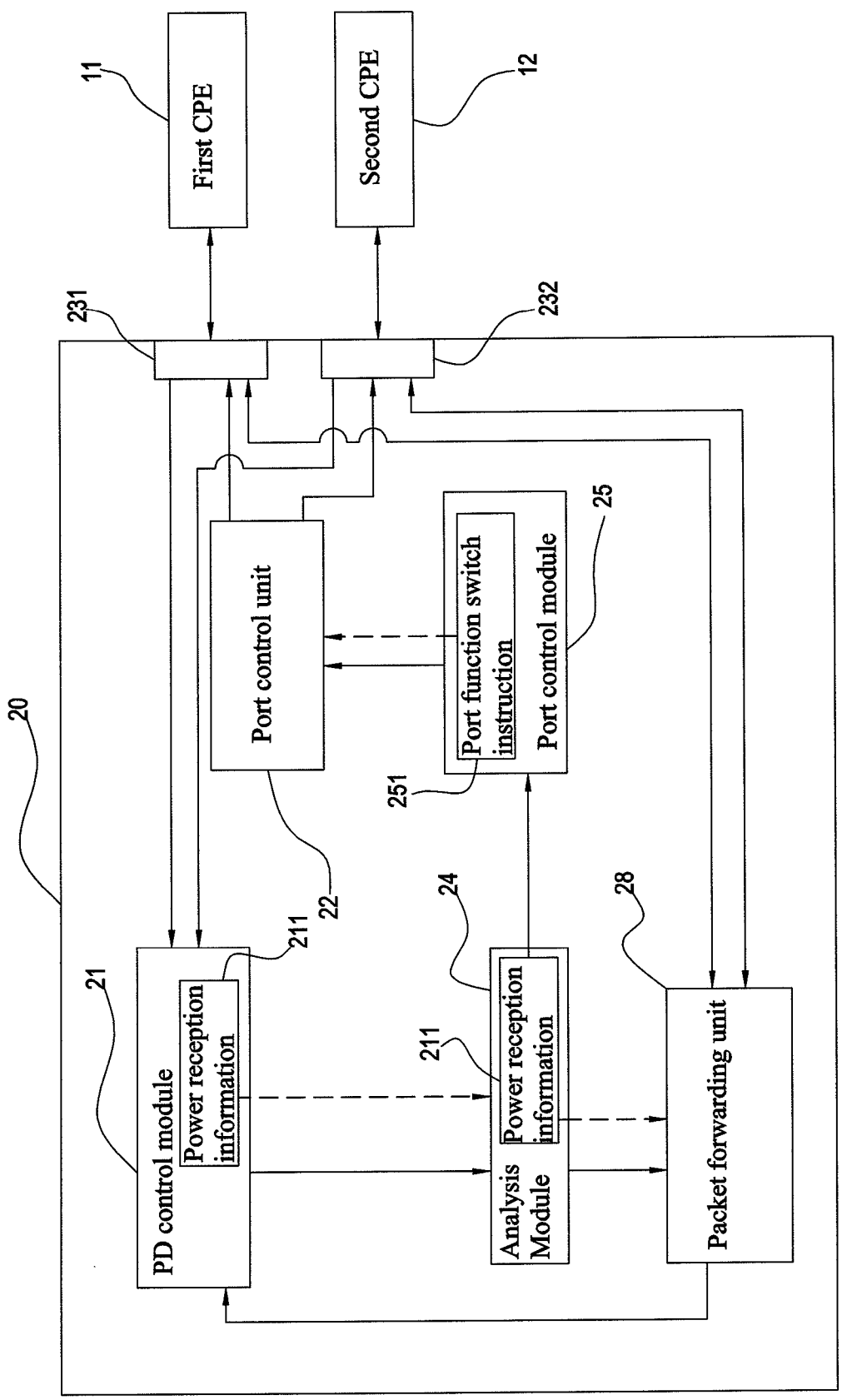
FIG. 6 is a schematic architectural view of a network system according to a third embodiment of the present invention.
Figure 7:
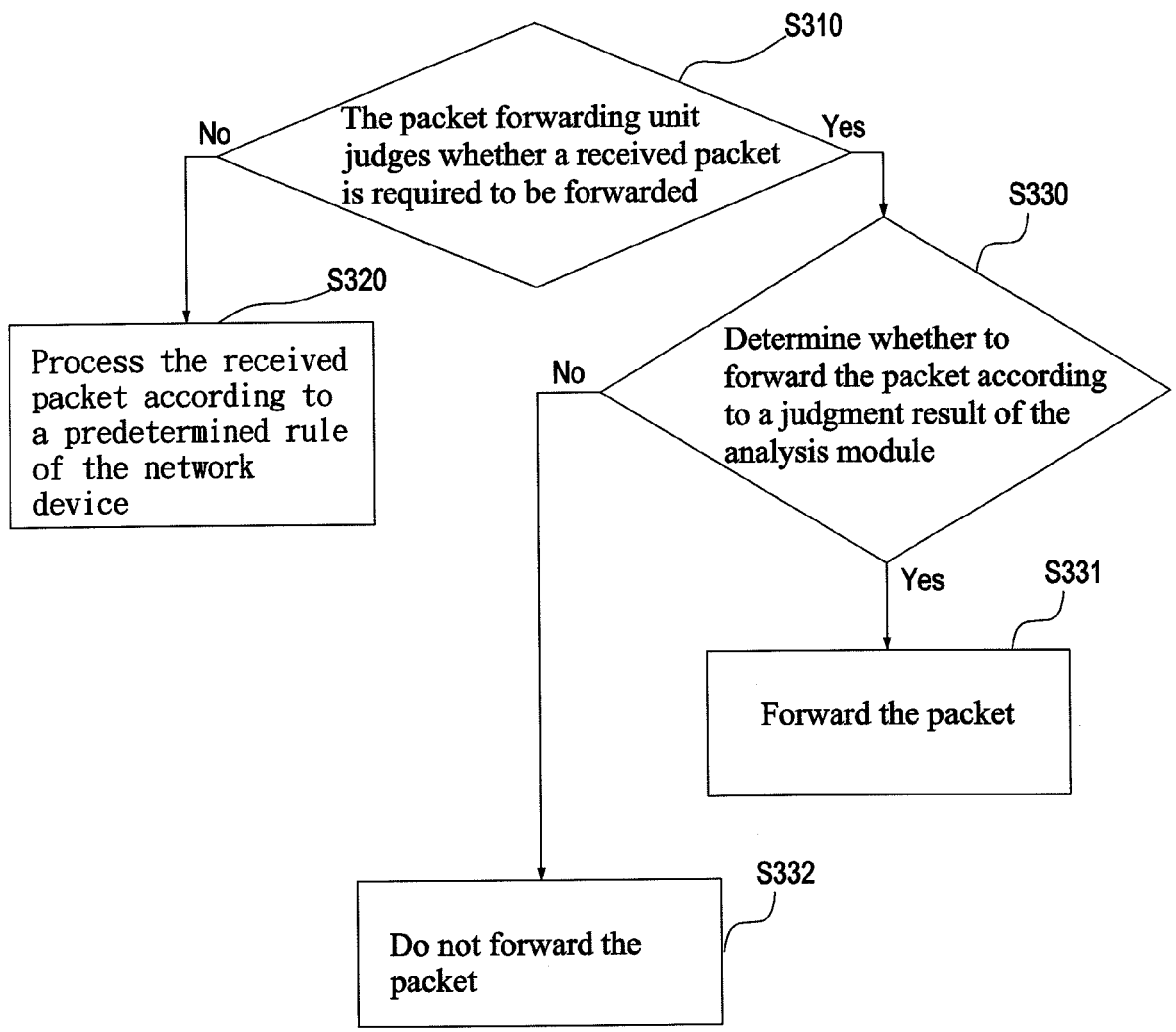
FIG. 7 is a flow chart of packet forwarding judgment according to an embodiment of the present invention.

Referring to FIG. 6, FIG. 6 is a schematic architectural view of a network system according to a third embodiment of the present invention. Different from the foregoing embodiments, the network system further includes a packet forwarding unit 28. The packet forwarding unit 28 is coupled to the analysis module 24 and the ports (taking the first port 231 and the second port 232 for example). Referring to FIG. 7, FIG. 7 is a flow chart of packet forwarding judgment according to an embodiment of the present invention. Illustration of the method is as follows.

The packet forwarding unit 28 judges whether a received packet is required to be forwarded (Step S310). Assuming that the packet forwarding unit 28 acquires a packet transmitted from the first CPE 11 via the first port 231, the packet forwarding unit 28 parses the packet, and judges whether to perform forwarding.

If the packet forwarding unit 28 judges that the packet is not required to be forwarded, the received packet is processed according to a predetermined rule of the network device (Step S320).

If the packet forwarding unit 28 judges that the packet is required to be forwarded to, for example, the second CPE 12, the packet forwarding unit 28 determines whether the second CPE 12 is target equipment to which the packet may be forwarded according to a judgment result of the analysis module 24 (Step S330).

When the second CPE 12 is target equipment to which the packet may be forwarded, the packet forwarding unit 28 transmits the packet from the second port 232 to the second CPE 12 (Step S331).

On the contrary, when the second CPE 12 is not target equipment to which the packet may be forwarded, the packet forwarding unit 28 does not forward the packet (Step S332), and may discard the packet.

In view of the above, implementation or embodiments of the technical solutions presented by the present invention to solve problems are described herein, which is not intended to limit the scope of implementation of the present invention. Equivalent modification and improvement in accordance with the claims of the present invention or made according to the claims of the present invention is covered by the claims of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A network device, which is a powered device (PD) and receives power from a power sourcing equipment (PSE) of outside, comprising a port used for connecting a set of the power sourcing equipment (PSE), the network device comprising:
   an analysis module, used for judging whether the port is connected to the PSE;
   a powered device control module, coupled to the analysis module and used for generating a piece of power reception information according to whether the port is connected to the PSE, wherein the analysis module judges whether the port is connected to the PSE according to the power reception information;
   a packet forwarding unit, coupled to the analysis module, to determine whether to forward a received packet according to the judgment result of the analysis module if it is judged that the packet is required to be forwarded,
   wherein the packet forwarding unit further determines a target equipment to which the packet is forwarded;
   a port control module, used for providing a port function switch instruction according to a judgment result generated by the analysis module and enable or disable the port according to the port function switch instruction; and
   a power control module coupled to the analysis module, wherein the power control module generates a power selection instruction according to the power reception information, and the power selection instruction comprises a piece of port designation information used for designating a power signal transmitted by a corresponding port for power supply,
   wherein the port control module further comprises:
   a power detecting unit, coupled to the port and the power control module and used for generating the power selection instruction when the power supplied from the power sourcing equipment is interrupted,
   wherein the power control module designates a candidate port different from the port corresponding to the interrupted power supply by the power selection instruction, and uses a power signal transmitted by the candidate port for power supply.

2. The network device according to claim 1, wherein the power selection instruction comprises a piece of power integration information used for designating power signals on which the PD control module performs power integration.

3. The network device according to claim 1, further comprising:
   a port control unit, coupled to the port control module and the port, and used for enabling or disable the port according to the port function switch instruction.

4. A method for a network device to set operation of a port, wherein the network device is a powered device (PD), which receives power from a power sourcing equipment (PSE) of outside, the port is connected to the power sourcing equipment, the method comprising:
   judging whether the port is connected to the PSE by an analysis module;
   detecting whether the port is connected to the PSE to generate a piece of power reception information accordingly by a powered device control module;
   analyzing the power reception information to determine whether the port is connected to the PSE by the analysis module;
   providing a port function switch instruction according to a judgment result of the analysis module by a port control module;
   according to the port function switch instruction, enabling or disabling the port by the port control module;
   determining, by a packet forwarding unit, whether to forward a received packet according to the judgment result of the analysis if it is determined that the packet is required to be forwarded, wherein the packet forwarding unit further determines a target equipment to which the packet is forwarded; and
   generating power selection instruction according to the power reception information with a power control module, wherein the power control module is coupled to the analysis module, and wherein the power selection instruction comprises a piece of port designation information used for designating a power signal transmitted by a corresponding port for power supply,
   wherein the port control module further comprises:
   a power detecting unit, coupled to the port and the power control module and used for generating the power selection instruction when the power supplied from the power sourcing equipment is interrupted,
   wherein the power control module designates a candidate port different from the port corresponding to the interrupted power supply by the power selection instruction, and uses a power signal transmitted by the candidate port for power supply.

5. The method for a network device to set operation of a port according to claim 4, further comprising:
   selecting at least one power signal from power signals transmitted by each port according to the power selection instruction for power supply by the PD control module.

6. The method for a network device to set operation of a port according to claim 5, wherein the power selection instruction comprises a piece of port selection information used for designating a selection order of ports to select the port according to the order for power supply.

7. The method for a network device to set operation of a port according to claim 5, wherein the step of generating the power selection instruction according to the power reception information by the power control module further comprises steps of:

analyzing power of power signals provided by the PSE by a power detecting unit; and generating the power selection instruction according to the power of the power signals by the power control module.

8. The method for a network device to set operation of a port according to claim 7, wherein the power selection instruction comprises a piece of power designation information used for designating a power signal with highest power among the power signals transmitted by the ports for power supply.

9. A network device, which is a powered device (PD) and receives power from a power sourcing equipment (PSE) of outside, comprising a port used for connecting the power sourcing equipment, the network device comprising:

a powered device control module, coupled to the analysis module and used for generating a piece of power reception information according to whether the port is connected to the PSE;

an analysis module, connected to the powered device control module and used for judging whether the port is connected to the PSE;

a port control module, connected to the analysis module and used for providing a port function switch instruction according to a judgment result of the analysis module;

a port control unit, connected to the port control module and used for enabling or disable the port according to the port function switch instruction;

a packet forwarding unit, coupled to the analysis module, to determine whether to forward a received packet according to the judgment result of the analysis module if it is determined that the packet is required to be forwarded, wherein the packet forwarding unit further determines a target equipment to which the packet is forwarded; and a power control module coupled to the analysis module, wherein the power control module generates a power selection instruction according to the power reception information, and the power selection instruction comprises a piece of port designation information used for designating a power signal transmitted by a corresponding port for power supply, wherein the port control module further comprises:

a power detecting unit, coupled to the port and the power control module and used for generating the power selection instruction when the power supplied from the power sourcing equipment is interrupted;

wherein the power control module designates a candidate port different from the port corresponding to the interrupted power supply by the power selection instruction, and uses a power signal transmitted by the candidate port for power supply.

10. The network device according to claim 9, wherein the power selection instruction comprises a piece of power integration information used for designating power signals by which the powered device control module performs power integration.

11. The network device according to claim 9, wherein the power selection instruction includes a piece of port designation information, the power control module determines ports having a flowing power signal according to the power reception information, designates one of the ports, and uses the power signal transmitted by the designated port for powering.

12. The network device according to claim 9, wherein the power selection instruction includes a piece of port selection information, the power control module determines ports having a flowing power signal according to the power reception information, and sets a selection order of the ports, the powered device control module selects the port according to the selection order, and makes the selected port transmit power for powering.

13. The network device according to claim 9, further comprising:

a power detecting unit;

wherein the power control module makes the power detecting unit analyzes the power of the signal of the power sourcing equipment according to the power reception information to generate a power selection.

\* \* \* \* \*